(12) United States Patent
Kim et al.

(10) Patent No.: US 7,808,928 B2
(45) Date of Patent: Oct. 5, 2010

(54) TESTING USER TERMINAL STATUS

(75) Inventors: Yong-Shin Kim, Suwon-si (KR); Joon-Sung Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1065 days.

(21) Appl. No.: 11/322,265

(22) Filed: Jan. 3, 2006

(65) Prior Publication Data
US 2006/0159245 A1 Jul. 20, 2006

(30) Foreign Application Priority Data
Jan. 19, 2005 (KR) ............... 10-2005-0005148

(51) Int. Cl.
*H04L 12/28* (2006.01)
(52) U.S. Cl. ............ 370/255; 370/218; 370/221; 370/242; 370/352; 370/410; 455/401; 455/414.1; 455/421; 455/425; 455/435.1; 709/201; 709/202; 709/203; 709/224; 709/225
(58) Field of Classification Search ......... 370/216–228, 370/241–242, 254–258, 351–356; 455/3.03, 455/3.04, 401, 414.1, 421, 423, 425; 709/201–203, 709/223–226
See application file for complete search history.

(56) References Cited

U.S. PATENT DOCUMENTS

| | | | | |
|---|---|---|---|---|
| 6,892,230 | B1* | 5/2005 | Gu et al. ............... | 709/220 |
| 6,985,445 | B1* | 1/2006 | Hao et al. ............. | 370/242 |
| 7,031,280 | B2* | 4/2006 | Segal .................. | 370/331 |
| 7,352,705 | B1* | 4/2008 | Adhikari et al. ........ | 370/248 |
| 7,379,461 | B2* | 5/2008 | Wu et al. ............. | 370/395.2 |
| 2003/0046405 | A1* | 3/2003 | O'Neill et al. ......... | 709/228 |
| 2003/0236892 | A1* | 12/2003 | Coulombe ............. | 709/228 |
| 2004/0153547 | A1* | 8/2004 | Trossen .............. | 709/228 |
| 2004/0248600 | A1* | 12/2004 | Kim ................... | 455/466 |
| 2004/0250253 | A1* | 12/2004 | Khartabil ............. | 719/310 |
| 2005/0009533 | A1* | 1/2005 | Benveniste et al. ..... | 455/452.2 |
| 2005/0050194 | A1* | 3/2005 | Honeisen et al. ....... | 709/224 |
| 2005/0074031 | A1* | 4/2005 | Sunstrum .............. | 370/493 |
| 2005/0174987 | A1* | 8/2005 | Raghav et al. ......... | 370/351 |
| 2005/0254510 | A1* | 11/2005 | Oja et al. ............. | 370/431 |
| 2006/0002327 | A1* | 1/2006 | Kallio et al. .......... | 370/328 |
| 2006/0072481 | A1* | 4/2006 | Hirsbrunner et al. .... | 370/254 |

(Continued)

FOREIGN PATENT DOCUMENTS

KR 10-2005-0002335 1/2005

*Primary Examiner*—Hemant Patel
(74) *Attorney, Agent, or Firm*—H.C. Park & Associates, PLC

(57) ABSTRACT

A network system and method of testing the terminal status so as to acquire the link status of the wired/wireless terminals associated to the VoIP-based network includes at least one user terminal which transmits a status message in response to a SIP-based Options message and a soft switch which transmits the Option message, determines whether or not the status message has been received, and recognizes whether the user terminal is in a Busy state or an Idle state based on a result of the determination. Since the terminal status can be accurately determined, it is possible to process calls, manage the terminal, and fairly charge the utilization costs to improve the stability and QoS of the network system.

18 Claims, 3 Drawing Sheets

U.S. PATENT DOCUMENTS

| | | | |
|---|---|---|---|
| 2006/0116128 A1* | 6/2006 | Benveniste | 455/445 |
| 2006/0165064 A1* | 7/2006 | Brown et al. | 370/352 |
| 2007/0106795 A1* | 5/2007 | Gilfix et al. | 709/226 |
| 2007/0201665 A1* | 8/2007 | Kocan et al. | 379/201.02 |

* cited by examiner

OPTIONS – ToTag
486 BUSY

OPTIONS
200 OK

TESTING USER TERMINAL STATUS

CLAIM OF PRIORITY

This application makes reference to, incorporates the same herein, and claims all benefits accruing under U.S.C. §119 from an application for SYSTEM AND METHOD FOR TESTING STATUS OF USER TERMINAL BACKGROUND OF THE INVENTION earlier filed in the Korean Intellectual Property Office on Jan. 19, 2005 and there duly assigned Serial No. 2005-5148.

BACKGROUND OF THE INVENTION

1. Field of the Invention

The present invention relates to testing user terminal status and, more particularly, to a network system and method of testing user terminal status to acquire the link status of a wired/wireless terminal associated with a Voice-over-Internet Protocol (VoIP)-based network.

2. Description of the Related Art

Voice-over-IP (VoIP), represented by an Internet Phone, is advantageous to integrally support voice and various multimedia services as well as to provide low cost voice communication service. Furthermore, the VoIP is of importance because it is considered as a core technology for integrating various network technologies into the All IP network using the Internet Protocol (IP).

Most presently commercialized VoIP systems are implemented using a signaling protocol H.323 of the International Telecommunication Union-Telecommunication Standardization Sector (ITU-T). However, H.323 has many problems with respect to expandability and integrality and is difficult implement due to its complexity, since H.323 has been proposed for implementing the video conference system in a Local Area Network (LAN) environment on which the service quality is not secured.

Session Initiation Protocol (SIP), proposed for activating and terminating a multimedia session, is advantageous since it has low implementation complexity and an improved service expandability and integrality, and was conceived in consideration of the Internet, whereby it can accommodate the various multimedia services on the Internet.

SIP is a protocol for easily inviting a counterpart during a video conference or telephone communication rather than controlling the users of the video conference or telephone communication. SIP is not limited to a certain protocol stack but is defined on the basis of a text such as the Hyper Text Transfer Protocol (HTTP), such that it is easy to expand its utilization. SIP can use the conventional e-mail address and provide mobility using a location positioning message such that it is possible to receive the call at the positioned location.

Typical VoIP system uses SIP as the signaling protocol and RealTime Protocol (RTP) for transmitting voice traffic. Also, User Datagram Protocol (UDP) is used as the transmission protocol for transmitting the SIP message and RTP packets. By utilizing the UDP which provide a connectionless service, it is possible to reduce the time for setup of the connection, which is required in the transmission control protocol providing connection-oriented service, resulting in a reduction of the call setup time.

A VoIP terminal based on SIP uses SIP for call processing messages of voice communication between the terminals, and a soft switch, which processes the SIP call processing message, manages the communication between the VoIP terminals. The soft switch knows the terminal number, IP address, and call state information of a VoIP terminal, and provides functions for establishing a link to the counterpart terminal using at least one of a Register message, an Invite message, a Bye message, an Ack message, a Cancel message, and an Options message, etc. The Invite message is used by the terminal for requesting the soft switch to associate the session, the Bye message is used by the terminal for requesting the soft switch to terminate the session, the Ack message is used by the terminal for reporting the response from the soft switch, the Cancel message is used by the soft switch and/or the terminal for canceling the present procedure, and the Option message is used by the soft switch for requesting capability information from the terminal.

The soft switch checks the link status of the VoIP terminal and maintains the network system stability by performing an appropriate call processing procedure. In order for the soft switch to acquire the link state of the VoIP terminal, the SIP based Register message is used. That is, upon turning on, the VoIP terminal transmits the Register message, and the soft switch receives the Register message and checks the link state of the VoIP terminal. Sequentially, upon receiving the Invite message having the terminal information, such as the transmitter and receiver IP addresses, and Call ID from one of the registered VoIP terminals, the soft switch responsively transmits a 200 OK message to establish the call, register the Call ID, and transmit a Call message to the receiver terminal, whereby an RTP session is established between the transmitter terminal and the receiver terminal, resulting in entrance of a communication (busy state).

The soft switch receives the Register messages from respective terminals periodically so as to check the link states of the terminals. Since the soft switch checks the link state using the Register message in a busy state, the register message can be used as basic information for utilization charges. Also, the link state between the terminal and the soft switch is checked using the Register message such that it is possible to check the Death/Idle and Busy states to perform network management, calculate utilization charges, and effect processing for a new call.

Even though the soft switch can manage the call phase of the terminal in cases of the normal establishment and relief through the communication link between the terminals, it is impossible for the soft switch to manage the call phase in realtime when there is a message loss due to the abrupt impact of the terminal and network problems.

Also, the soft switch receives the register messages from many terminals in a unit time and must process the Invite messages in realtime such that the traffic load increases in proportion to the number of the registered terminals, resulting in a reduction of service quality.

Also, since the terminal must transmit the Register message to the soft switch periodically, e.g. every hour, the soft switch can not acquire the terminal status during the intermediate time between the register messages transmissions.

Recently, Wireless LAN (WLAN) technology-integrated handheld phones have been adopted for use as VoIP terminals. Such portable VoIP terminals have been represented by WiFi Phones based on the WLAN and have been developed in other local wireless networks such as Zigbee, UWB, Bluetooth, etc. All of the WiFi, Zigbee, UWB, and Bluetooth phones, etc. can be called mobile terminals.

The mobile terminals transmit the SIP message to the soft switch through an Access Point (AP) providing the access service using at least one of competition or non-competition media access control schemes to establish the connection to the counterpart mobile or fixed terminal. The procedure in which the AP provides the terminal with the media access service to establish the link to the counterpart terminal has been omitted to simplify the explanation.

That is, the mobile terminal transmits the Invite message to the soft switch and the soft switch transmits the invite message to the counterpart mobile terminal. In response to the Invite message, the receive mobile terminal transmits the 200 OK message to the mobile terminal via the soft switch such that the RTP session is established between the mobile terminals so as to communicate each other.

However, if one of transmit and receive mobile terminals crashes so as to be in an abnormal state during the communication, the communication link between the mobile terminals via the soft switch is broken. Even though the crashed mobile terminal can not transmit the Bye message to the soft switch, the soft switch regards the state of the crashed mobile as the busy state before receiving the Register message. Accordingly, even though the communication link to the crashed mobile terminal has been broken, the utilization charge is unfairly imposed.

Also, even when the communication link between the mobile terminals is broken due to the termination of the RTP session caused by problems of the network equipment or AP, the soft switch maintains the state of the terminal as busy until receiving the Register message since it doesn't receive the Bye message. Accordingly, the soft switch can not process a new call when receiving the Invite message from another terminal even when the previous communication link has been broken, and continues charging the utilization cost until receiving the Register message, resulting in an overcharge.

SUMMARY OF THE INVENTION

The present invention has been made in an effort to solve the above problems. It is an object of the present invention to provide a system and a method of inspecting a present state of a VoIP terminal regardless of the actual terminal state, i.e., Busy, Idle, and Death states.

In order to achieve the above object, a network system of testing a terminal status according to the present invention includes at least one user terminal which transmits a status message in response to an SIP-based Options message and a soft switch which transmits the Option message, determines whether or not the status message has been received, and recognizes whether the user terminal is in a Busy state or an Idle state based on a result of the determination.

Preferably, the network system further includes a third terminal which transmits the Options message to the user terminal, determines whether or not the status message has been received from the user terminal, and recognizes whether the user terminal is in one of Busy, Idle, and Death states based on a result of the determination.

Preferably, the third terminal is one of a server and an operator terminal providing the terminal with the Options message while the user terminal is in one of the Busy, Idle, and Death states.

Preferably, the soft switch is one of an SIP server, an SIP Proxy server, an IP switch, and an intermediate switch.

Preferably, the status message is one of a 200 OK message, a 468 Busy message, and a 481 Not Exist message.

Preferably, the 200 OK message is a successful response message from the user terminal and indicates that the user terminal is in a normal Busy state when the Options message contains a Call ID identical with that of an Invite message, and is a successful response message from the user terminal and indicates that the user terminal is in a normal Idle state when the Options message does not contain a To Tag.

Preferably, the 468 Busy message is a request failure message transmitted by the user terminal and indicates that the user terminal is in a normal Busy state when the Options message contains a Call ID different from that of an Invite message.

Preferably, the 481 Not Exist message is a request failure message transmitted by the user terminal and indicates that the user terminal is in a normal Idle state when the Options message does not contain a To Tag.

Preferably, the Options message is one of an SIP-based message defined by RFC 3261.

Preferably, the user terminal is in the Death state if one of the soft switch and the third terminal does not receive the status message from the user terminal.

In another aspect of the present invention, a method of inspecting status of a user terminal in a network system includes transmitting, by the network system, a Options message to a user terminal and determining whether or not a status message has been received from the user terminal in response to the Options message.

Preferably, the method further includes counting elapsed time after the Options message has been transmitted and determining that network of the user terminal is blocked if the elapsed time is greater than a predetermined threshold value.

Preferably, the method further includes determining whether the terminal is in a Busy state or an Idle state according to the status message.

Preferably, the step of transmitting the Options message includes transmitting the Options message from a soft switch to the user terminal for call processing and transmitting the Options message from a third terminal to the user terminal for monitoring the user terminal.

Preferably, the third terminal is one of a server and an operator terminal that transmits the Options message when the user terminal is in one of a Busy state, an Idle state, and a Death state, determines whether or not there is a status message received from the user terminal in response to the Options message, and regards the status of the terminal as one of the Busy, Idle and Death states.

Preferably, the Options message is an SIP-based message defined in RFC.

Preferably, the step of transmitting the Options message from the soft switch to the user terminal includes transmitting the Options message from the soft switch to the user terminal which is in the Busy state, transmitting the Options message from the soft switch to the user terminal which is in the Idle state, and transmitting the Options message from the soft switch the user terminal which is in the Death state.

Preferably, the step of transmitting the Options message from the third terminal to the user terminal includes transmitting the Options message from the third terminal to the user terminal which is in the Busy state, transmitting the Options message from the third terminal to the user terminal which is in the Idle state, and transmitting the Options message from the third terminal to the user terminal which is in the Death state.

Preferably, the status message is one of a 200 OK message, a 468 Busy message, and a 481 Not Exist message.

Preferably, the 200 OK message is a successful response message from the user terminal and indicates that the user terminal is in a normal Busy state when the Options message contains a Call ID identical with that of an Invite message and is a successful response message from the user terminal and indicates that the user terminal is in a normal Idle state when the Options message does not contain a To Tag.

Preferably, the 468 Busy message is a request failure message transmitted by the user terminal and indicates that the user terminal is in a normal Busy state when the Options message contains a Call ID different from that of an Invite message.

Preferably, the 481 Not Exist message is a request failure message transmitted by the user terminal and indicates that the user terminal is in a normal Idle state when the Options message does not contain a To Tag.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein.

DETAILED DESCRIPTION OF THE INVENTION

The system and method of inspecting the status of a terminal according to an embodiment of the present invention is described hereinafter with reference to the accompanying drawings. In the network system of inspecting the status of a terminal, a soft switch acquires the state of the terminal, i.e, one of Busy, Idle, and Death states, using the Options message to quickly and accurately recognize the terminal status.

Figure 1:
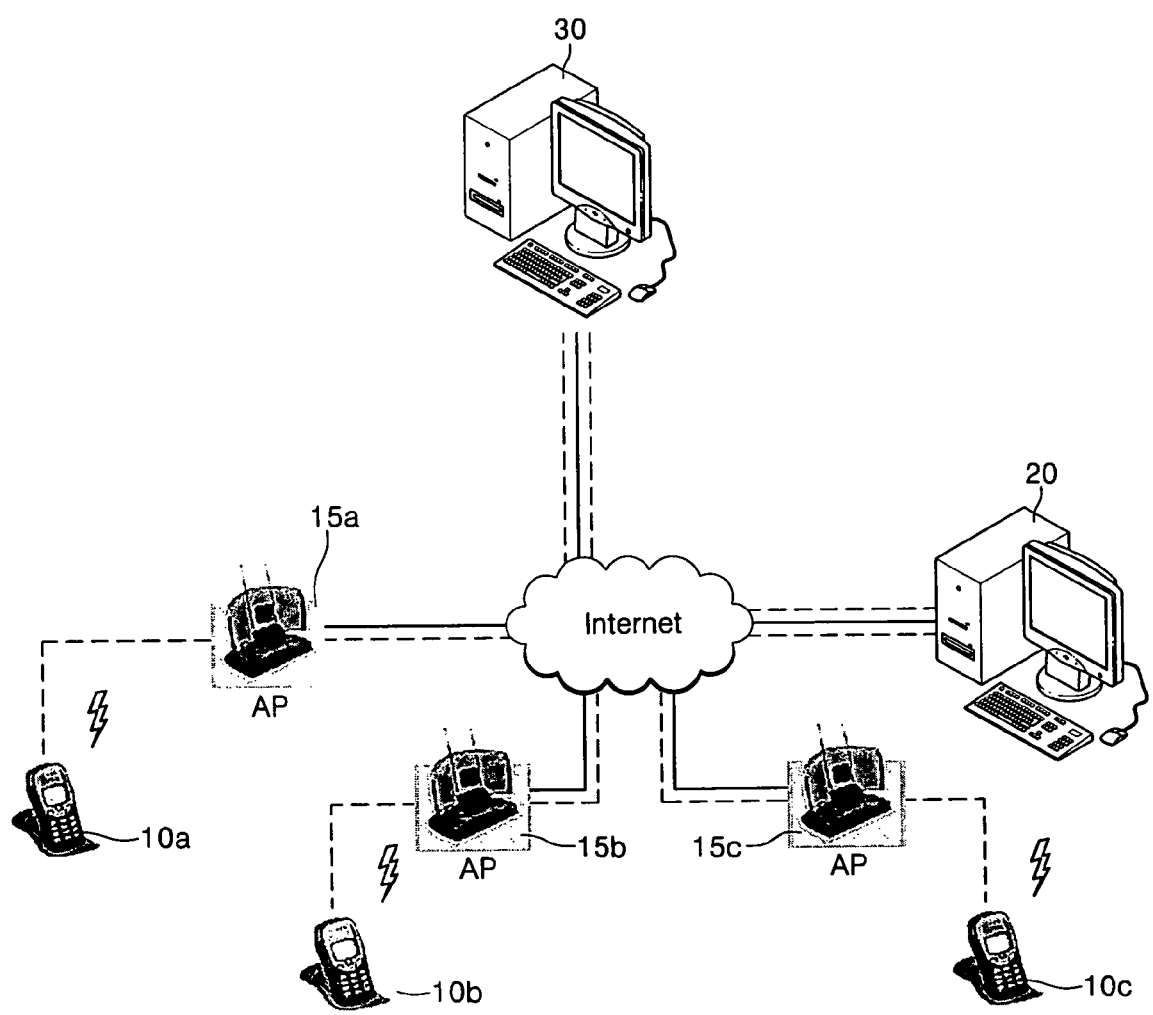
FIG. 1 is a view of a VoIP based network system to inspect the status of a mobile terminal.

FIG. 1 is a view of a VoIP based network system to inspect the status of a mobile terminal.

As shown in FIG. 1, the system includes mobile terminals 10a, 10b, and 10c, that can be any of the wireless communication terminals based on the Wireless Local Area Network (WLAN), APs 15a, 15b, and 15c for providing the mobile terminals 10a, 10b and 10c with media access service based on competition and non-competition schemes, and a soft switch 20 connected to the APs 15a, 15b, and 15c over the wired/wireless network to establish and relieve the RTP session by performing the call setup procedure with the SIP message, and managing the mobile terminals. The SIP message is a message defined in RFC 3261.

That is, the SIP message is a predetermined message for processing the call between the soft switch 20 and the mobile terminals 10a, 10b and 10c and includes the request messages transmitted from the terminals 10a, 10b, and 10c to the soft switch or vice versa. The Request message includes Request Line, Header fields, and Message Body. The Request Line includes a Method, Request-URI, Protocol version, and CALF. The Message Body can include a Register message, an Invite message, a Bye message, an Ack message, a Cancel message, and Options message, such that at least one of the messages is exchanged between terminals for establishing the communication.

The Register message is used by the mobile terminals 10a, 10b, and 10c for providing the soft switch 20 with the location information. The Invite message is used by the mobile terminals 10a, 10b, and 10c for requesting the soft switch to be associated in the session so as to perform the call processing. The Bye message is used by the mobile terminals 10a, 10b, and 10c or the soft switch 20 for terminating the session. The Ack message is used by the terminals 10a, 10b, and 10c for acknowledging the reception of the response message from the soft switch 20. The Cancel message is used by the soft switch 20 or the mobile terminals 10a, 10b, and 10c for terminating the present process. The Options message is used by the soft switch 20 for requesting the mobile terminal to report the capability information thereof.

The terminal 10a, 10b, or 10c transmits the SIP based Request message to the soft switch 20 for connection establishment, and the soft switch 20 performs the call processing upon reception of the Request message. The soft switch 20 analyzes the Request message and performs appropriate processes for the terminal 10a, 10b, or 10c and itself. That is, upon receiving one of the Request messages, the terminal 10a, 10b, or 10c or the soft switch 20 transmits a SIP Response message in response to the Request message. The Options message is used only by the soft switch 20. However, other messages except for the Options message are generated by a terminal and transmitted to the soft switch 20 and other terminals.

The Response message is formed with status codes indicating the terminal status, call processing status, error, etc. and is transmitted in response to the Request message. Among the status codes, $1xx$ is an information response, $2xx$ is a successful response, $3xx$ is a redirection response, $4xx$ is a client error and request failure, and $5xx$ is a global failure. The Response message contains the status code including the terminal information associated with the network and is called a "status message."

The terminal status inspection system of the present invention has been discussed on the basis of a WLAN with WLAN terminals. However, the system is not limited to the WLAN, but can be implemented over a wired LAN system using an SIP-based Request message and Response message. Accordingly, the wireless terminal of a WLAN and the fixed terminal LAN can be in the same category such that they can be called "terminals" and will be indicated by the same reference numerals 10a, 10b, and 10c.

The network system of the present invention performs call processing between the terminals according to the SIP-based Request and Response messages, and further includes a third terminal 30 which transmits a monitoring message, which is used for monitoring the network system, to the other terminals and the soft switch 20. The third terminal 30 can be any server which enters the network system and monitors the terminals 10a, 10b, and 10c, and other elements, or can be an operator terminal for efficiently managing the network system. The server can be a SIP server, an SMS server, an MMS server, or the like that has a monitoring capability. The terminals 10a, 10b, and 10c and the soft switch 20 are inner elements inside the network system for processing the call, and the third terminal 30, i.e., the operator terminal and/or server, is an outer element connected to the network system so as to be managed by the operator.

As described above, the soft switch 20 processes the voice and video and audio integrated data communications through the RTP session between the terminals using the SIP messages, and the soft switch 20 can be replaced by an SIP server and SIP Proxy server, an IP switch, and an intermediate switch, which have identical functions.

Figure 2:
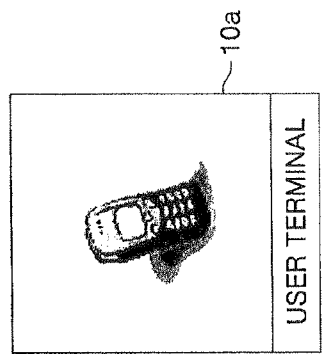
FIG. 2 is a view of a method of testing a terminal which is in a Busy state.
Figure 2:
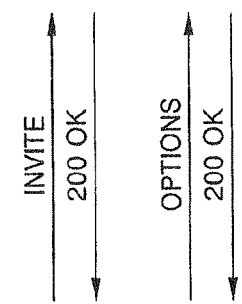
Figure 2:
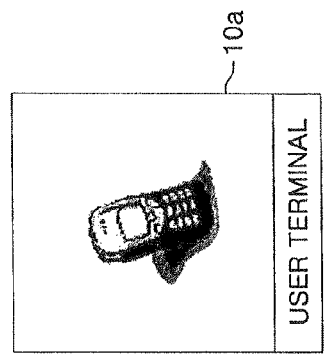
Figure 3:
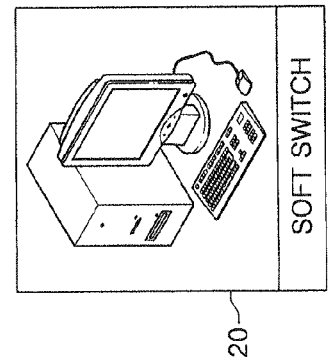
FIG. 3 is a view of a method of testing a terminal which is in an Idle state by a soft switch as an inner element of the network system.
Figure 3:
Figure 3:
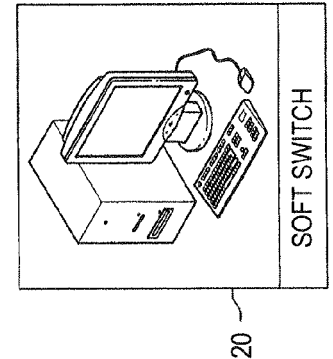

The terminal link test method of the network system of the present invention is depicted in FIG. 2 to FIG. 5. The method of testing the terminal status by the soft switch, which is an inner element of the network system, is described below with respect to the Busy state and Idle state of the terminal. FIG. 2 is a schematic view of the method of testing a terminal which is in a Busy state, and FIG. 3 is a schematic view of the method of testing a terminal which is in an Idle state.

The terminal 10a inside the network system transmits the Invite message for requesting communication with the other terminal 10b. The Invite message is received by the soft switch 20 as the inner element of the network system through the network. The Invite message includes transmit terminal information, such as "From; 1000@home.com" and receive terminal information such as "To; 2000@home.com" and Call ID such as "1234" as well as the basic information for establishing the communication link. For simplifying the explanation, the "From; 1000@home.com" and "To; 2000@home.com" will be called the "From Tag" and "To Tag", respectively.

When the terminals 10a and 10b are wireless terminals, APs 15a and 15b are interconnected between the terminals 10a and 10b and the soft switch 20 such that each AP provides the terminals with the media access service and forwards the Invite message received from the terminal to the soft switch 20.

The soft switch 20 sets up a Call ID on the basis of the Invite Message via the connection establishment procedure and forwards the Invite message to the receive terminal 10b (see FIG. 1) having the identical "To Tag." The receive terminal 10b transmits the 200 OK message to the transmit terminal 10a in response to the Invite message via the APs and the soft switch 20 such that the connection is established between the transmit terminal 10a and the receive terminal 10b (see FIG. 1) in the RTP session. The Invite message initiates the communication between the transmit terminal 10a of the "From Tag" and the receive terminal 10b of the "To Tag" connected in the RTP session. The system formed by the communication network is the system in which the transmit terminal 10a and the receive terminal 10b communicates with each other via the communication channel of Call ID so as to be in Busy state.

As shown in FIG. 2, the soft switch 20, as the inner element of the network system, transmits the Options message to at least one of the transmit terminal 10a and the receive terminal 10b for testing the link status. The Options message is transmitted to each terminal in one minute intervals and has a data format nearly identical with that of the Invite message. More particularly, the Options message has a Call ID identical with that of the Invite message. The terminal 10a determines that the Call ID contained in the Options message is identical with its Call ID and transmits the status message indicating "Present state is Normal communication state" to the soft switch 20. The status message is a 200 OK message because the terminal is in the busy state.

Upon reception of the 200 OK message, the soft switch 20 recognizes the terminal is in the normal communicate state so as to continue charging until receiving the Bye message from the terminals 10a and 10b. Since the Options message is repeatedly transmitted in short time intervals, i.e., every minute, the soft switch 20 can recognize the status of the terminals 10a and 10b through the response message in response to the Options message regardless or whether or not the terminal is in the normal communication state.

Upon receiving the Bye message from the terminals 10a and 10b associated in the present communication, the soft switch 20 inside the network system performs a communication termination procedure by terminating the RTP session and prepares a new call.

In case of termination of the communication or no initiation of the communication as shown in FIG. 3, the soft switch 20, as the inner element of the network system, transmits the Options message to at least one of the terminals for testing the link state of the corresponding terminal every minute. The Option message includes the From Tag of the soft switch 20 and the To Tag of the terminal to be tested, but no Call ID because the terminal is not in communication.

Upon reception of the Option message, the terminal 10a checks that the Options message does not contain the Call ID and transmits the status message indicating "There is no call to transmit" to the soft switch 20. This status message is a "481 Not Exist" message for indicating that there is no call request. Accordingly, upon reception of the 481 Not Exist message, the soft switch 20 recognizes that the terminal 10a is in the Idle state, such that the soft switch 20 determines that the terminal 10a is waiting for a new call and can prepare a new call.

As described above, in the terminal status test method of the network system, the soft switch 20 tests the terminal status using the Options message. The terminal status test method in which the third terminal 30, as the outer element of the network system, tests the status of the terminals 10a, 10b, and 10c as the interior elements is described below.

Figure 4:
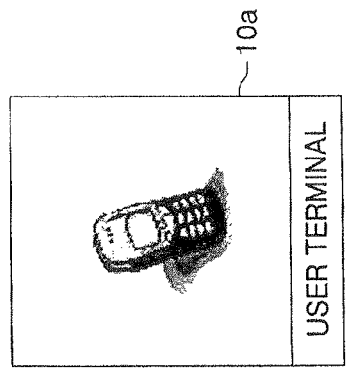
FIG. 4 is a view of a method of testing the status of a terminal in a Busy state by a third terminal as an outer element of the network system.
Figure 4:
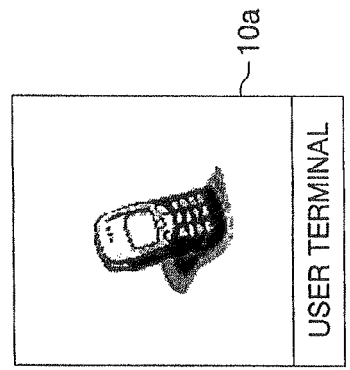
Figure 5:
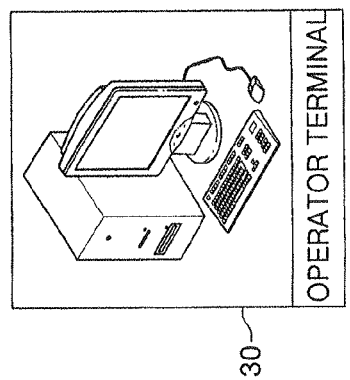
FIG. 5 is a view of a method of testing the status of a terminal in an Idle state by a third terminal as an outer element of the network system.
Figure 5:
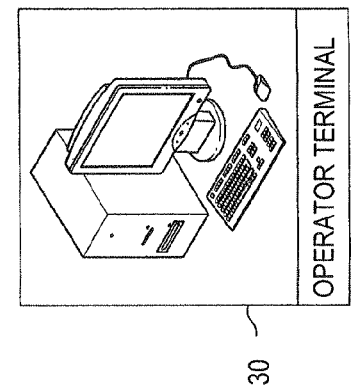

FIG. 4 is a schematic view of a method of testing the status of the terminal in the Busy state by the third terminal as an outer element of the network system, and FIG. 5 is a schematic view of a method of testing the status of the terminal in the Idle state by the third terminal.

As shown in FIG. 4, in the Busy state, the third terminal 30, as the outer element of the network system, transmits the Options message to at least one of the terminals 10a, 10b, and 10c to test the link state of the corresponding terminal every minute. The Options message contains a Call ID, which is different from that of the Invite message even though the target terminal is in the Busy state, and the From Tag of the third terminal 30 and the To Tag of the terminal 10 to be tested.

Upon reception of the Option message, the terminal 10 determines that an Invite message has been transmitted from another terminal due to the different Call ID contained in the Option message, such that the terminal 10 transmits the status message indicating "Call request is failed" to the third terminal 30 corresponding to the From Tag. This status message is a request failure message represented by a 468 Busy message. Accordingly, upon receiving the 468 Busy message, the third terminal 30 recognizes that the target terminal 10 is in the Busy state. As described above, the third terminal 30 is an operator terminal or a server which can enter the network system.

As shown in FIG. 5, in case of Idle state, the third terminal 30 transmits the Options message to at least one of the terminals 10a, 10b, and 10c to test the link state of the corresponding terminal. The Options message is transmitted to the respective terminal 10a, 10b, and 10c in one minute time intervals after the communication between the terminals has been terminated such that the Options message includes only the From Tag but not the To Tag and the Call ID.

The terminal 10a determines that a Request message has been received from the third terminal 30 corresponding to the From Tag and transmits the status message indicating a "Normal Call-Waiting state" to the third terminal 30 via at least one of the elements of the network system. The status message is a 200 OK message transmitted in response to the Request message since the terminal is not in the Busy state. Accordingly, upon reception of the 200 OK message, the third terminal 30 analyzes the 200 OK message as the successful response message such that it recognizes that the terminal is in the normal state and can process a new call.

When the RTP session is broken due to the unwanted impact or the problems on the network, the third terminal 30 determines that the target terminal is in the Death state if it does not receive the Response message in response to the Options message within one minute. Also, when the terminal enters the Death state by termination of the communication, the third terminal determines that the target terminal is in the Death state.

In the terminal status test method of the present invention, the terminal 10 transmits the status message to the soft switch 20 or the third terminal 30 in response to the Options message regardless of whether or not the terminal 10 is busy, except when the terminal is in the Death state. When receiving the status message, it is possible to recognize that a terminal is alive and to recognize the present state of the terminal. In case of no response to the Options message until the next Options message is to be transmitted, the soft switch 20 or the third terminal 30 determines that the terminal is in the Death state and performs an emergency procedure for the terminal.

The present invention accurately tests the terminal status so as to determine whether or not the VoIP terminal is on the network regardless of its terminal state, i.e., the Busy, Idle, and Death states.

In the present invention, the VoIP terminal linked to the network is accurately tested regardless of the status of the terminal such that it facilitates call processing, managing the terminal, fairly charging the utilization cost, and improves the stability and QoS of the network system.

Also, the soft switch recognizes, in the present invention, the terminal status on the basis of the status message received in response to the Option message such that it is possible to reduce the data-processing load caused by the Register messages received in the Busy state and to improve the QoS.

The present invention is not limited to the exemplary embodiments, but, on the contrary, is intended to cover various modifications and equivalent arrangements included within the spirit and scope of the appended claims.

What is claimed is:

1. A network system to test user terminal status, the network system comprising:
   at least one user terminal adapted to transmit a status message in response to a Session Initiation Protocol (SIP)-based Options message; and
   a soft switch adapted to:
      transmit the Options message;
      determine whether or not the status message has been received; and
      recognize whether or not the at least one user terminal is in a Death state based on a result of the determination,
   wherein the status message comprises one of a 200 OK message, a 468 Busy message, and a 481 Not Exist message, and
   wherein the 200 OK message comprises at least one of:
      a successful response message from the user terminal indicating that the user terminal is in a normal Busy state in response to the received Options message containing a Call ID being identical to that of an Invite message; and
      a successful response message from the user terminal indicating that the user terminal is in a normal Idle state in response to the received Options message not containing a To Tag.

2. The network system according to claim 1, further comprising an another terminal adapted to:
   transmit the Options message to the at least one user terminal;
   determine whether or not the status message has been received from the at least one user terminal; and
   recognize whether or not the user terminal is in a Death state based on a result of the determination.

3. The network system according to claim 2, wherein the another terminal comprises one of a server and an operator terminal adapted to provide the terminal with the Options message upon the user terminal being in one of the Busy, Idle, and Death states.

4. The network system according to claim 1, wherein the soft switch comprises one of an SIP server, an SIP Proxy server, an Internet Protocol (IP) switch, and an intermediate switch.

5. The network system according to claim 1, wherein the 468 Busy message comprises a request failure message transmitted by the user terminal indicating that the user terminal is in a normal Busy state in response to the received Options message containing a Call ID being different from that of an Invite message.

6. The network system according to claim 1, wherein the 481 Not Exist message comprises a request failure message transmitted by the user terminal indicating that the user terminal is in a normal Idle state in response to the received Options message not containing a call ID.

7. The network system according to claim 1, wherein the Options message comprises an SIP-based message defined by RFC 3261.

8. The network system according to claim 1, wherein the soft switch is adapted to transmit the Options message to the at least one user terminal once every minute, the soft switch being further adapted to recognize that the at least one user terminal is in a Death state upon the soft switch failing to receive the status message from the at least one user terminal in response to the Options message for a minute after the transmission of said Options message.

9. A method of testing a user terminal status in a network system, the method comprising:
   transmitting a Session Initiation Protocol (SIP)-based Options message to a user terminal from the network system;
   determining whether or not a status message has been received from the user terminal in response to the Options message; and
   ascertaining whether or not the user terminal is in a Death state based on said determination,
   wherein the status message comprises one of a 200 OK message, a 468 Busy message, and a 481 Not Exist message, and
   wherein the 200 OK message comprises:
      a successful response message from the user terminal indicating that the user terminal is in a normal Busy state in response to the received Options message containing a Call ID being identical to that of an Invite message; and
      a successful response message from the user terminal indicating that the user terminal is in a normal Idle state in response to the received Options message not containing a To Tag.

10. The method according to claim 9, further comprising:
   counting elapsed time after the Options message has been transmitted; and
   determining that a network of the user terminal is in said Death state upon the elapsed time being greater than a predetermined threshold value, the network system being adapted to transmit the Options message to the user terminal once said predetermined threshold value of elapsed time, said predetermined threshold value of elapsed time being one minute.

11. The method according to claim 9, further comprising determining whether the terminal is a Busy state or an Idle state according to the status message.

12. The method according to claim 9, wherein transmitting the Options message comprises:
- transmitting the Options message from a soft switch to the user terminal for call processing; and
- transmitting the Options message from an another terminal to the user terminal for monitoring the user terminal.

13. The method according to claim 12, wherein the another terminal comprises one of a server and an operator terminal transmitting the Options message upon the user terminal being in one of a Busy state, an Idle state, and a Death state, determining whether or not a status message has been received from the user terminal in response to the Options message, and determining weather or not the user terminal status is in a Death state based on said determination.

14. The method according to claim 13, wherein the Options message comprises a Session Initiation Protocol (SIP)-based message defined in RFC 3261.

15. The method according to claim 12, wherein transmitting the Options message from the soft switch to the user terminal comprises:
- transmitting the Options message from the soft switch to the user terminal upon the user terminal being in the Busy state;
- transmitting the Options message from the soft switch to the user terminal upon the user terminal being in the Idle state; and
- transmitting the Options message from the soft switch the user terminal upon the user terminal being in the Death state.

16. The method according to claim 12, wherein transmitting the Options message from the another terminal to the user terminal comprises:
- transmitting the Options message from the another terminal to the user terminal upon the user terminal being in the Busy state;
- transmitting the Options message from the another terminal to the user terminal upon the user terminal being in the Idle state; and
- transmitting the Options message from the another terminal to the user terminal upon the user terminal being in the Death state.

17. The method according to claim 9, wherein the 468 Busy message comprises a request failure message transmitted by the user terminal indicating that the user terminal is in a normal Busy state in response to the received Options message containing a Call ID different from that of an Invite message.

18. The method according to claim 9, wherein the 481 Not Exist message comprises a request failure message transmitted by the user terminal indicating that the user terminal is in a normal Idle state in response to the received Options message not containing a call ID.

* * * * *